S. V. AND M. G. DUSSEAU.
DRIVE WHEEL ASSEMBLY.
APPLICATION FILED AUG. 25, 1919.
1,387,967.
Patented Aug. 16, 1921.
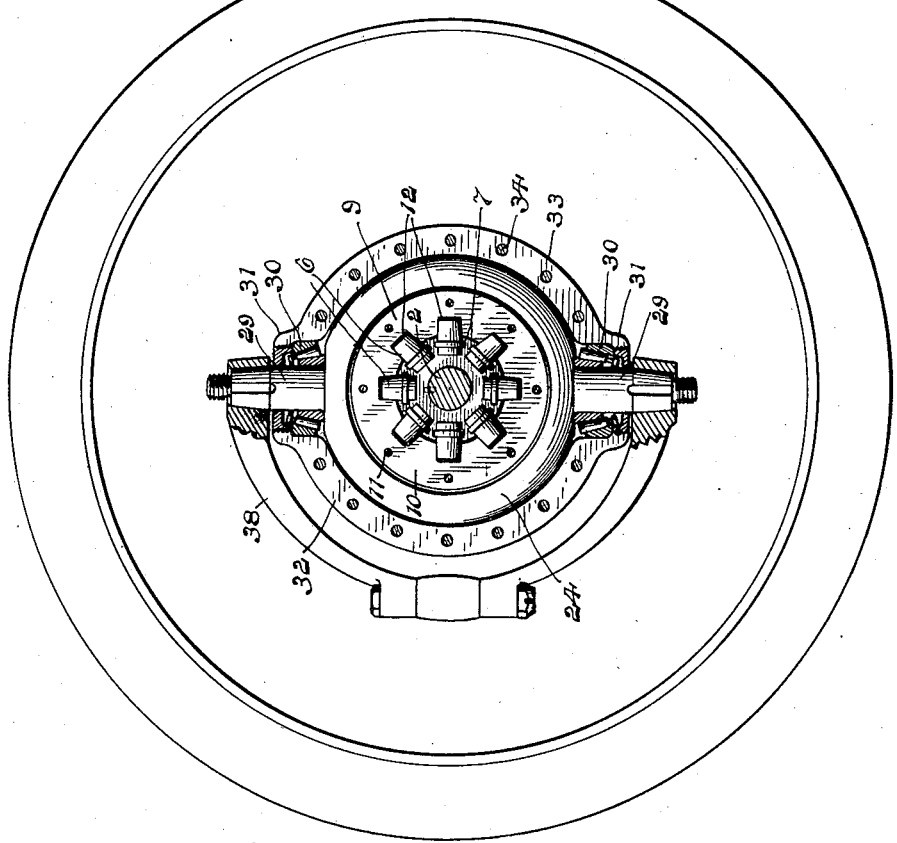
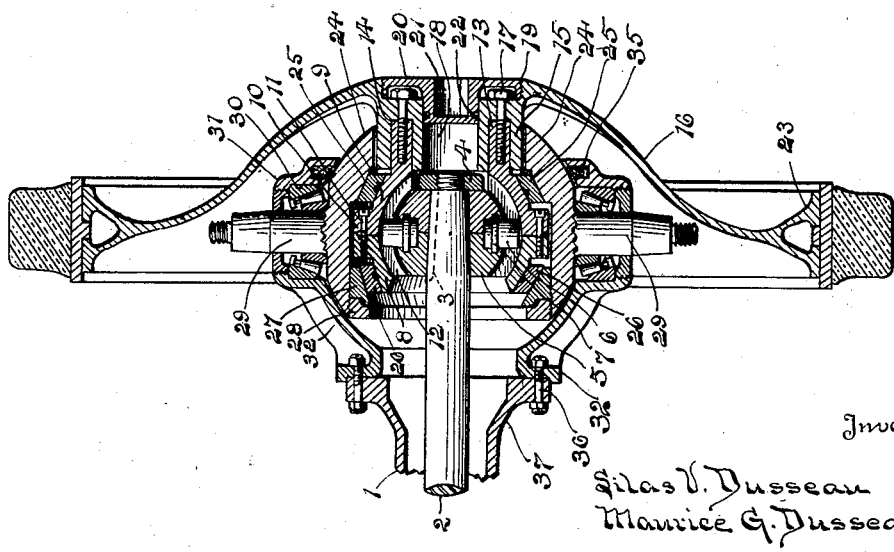
Inventor
Silas V. Dusseau
Maurice G. Dusseau
By
Attorneys

UNITED STATES PATENT OFFICE.

SILAS V. DUSSEAU, OF ERIE, AND MAURICE G. DUSSEAU, OF DETROIT, MICHIGAN.

DRIVE-WHEEL ASSEMBLY.

1,387,967.  Specification of Letters Patent.  Patented Aug. 16, 1921.

Application filed August 25, 1919. Serial No. 319,719.

*To all whom it may concern:*

Be it known that we, SILAS V. DUSSEAU and MAURICE G. DUSSEAU, citizens of the United States of America, residing at Erie, county of Monroe, and State of Michigan, and Detroit, county of Wayne, and State of Michigan, respectively, have invented certain new and useful Improvements in Drive-Wheel Assemblies, of which the following is a specification, reference being had therein to the accompanying drawings.

Our invention aims to provide a steering knuckle, for vehicle wheels, through which power may be transmitted for driving the wheels steered by the knuckle, and in order that this may be accomplished a novel universal joint is embodied in the hub of the wheel and the body of the wheel constructed so that the driving relation between the live axle and the wheel may at all times be in the plane of the wheel, thus eliminating any stresses and strains from the driving mechanism that might be incurred by a change in the direction of travel of the wheel.

Our invention further aims to provide an inclosed steering knuckle by which a wheel may be easily steered while being driven, and it is in this connection that our invention is applicable to that type of vehicle wherein it is desired to use a "four-wheel" drive.

Our invention further aims to provide a power driven steering wheel in which inner and outer ball and socket members are assembled in the hub of the wheel, some of said members constituting a steering knuckle which is inclosed and to a large extent protected by the body of the wheel, so that dirt, stones and other matter cannot interfere with the operation of steering the wheel. The novel construction entering into the steering knuckle permits of thorough lubrication and a positive driving relation between the various parts of the knuckle, and such construction will be hereinafter considered, with the assistance of the drawings, wherein—

Figure 1 is a vertical longitudinal sectional view of a vehicle wheel in accordance with our invention, and Fig. 2 is a vertical cross sectional view of the same.

In the drawing, the reference numeral 1 denotes an axle or shaft housing from which protrudes a driven axle or shaft 2, both of which are adapted to form part of the vehicle and the axle or shaft 2 is driven from the power plant thereof. The outer end of the axle 2 accommodate a key or spline 3 and a detachable nut 4.

5 denotes an inner ball member preferably made of two sections placed in abutting relation on the end of the axle 2 and held in driving relation thereto by the spline 3 and the nut 4. The confronting faces of the inner ball member sections are recessed to accommodate a plurality of radially disposed studs 6, each provided with a collar 7 to prevent radial shifting of the studs between the sections of the inner ball member.

8 and 9 denote the sections of an inner socket member and said sections have peripheral flanges 10 connected by screw bolts 11 or other fastening means, so that the sections 8 and 9 will form somewhat of a spherical body for the inner ball member 5. The sections 8 and 9 have the inner walls thereof provided with longitudinal grooves 12 corresponding in number to the studs 6 and it is into these grooves that the studs protrude so as to establish a driving relation between the inner ball and socket members during the steering of the wheel.

13 denotes a collar carried by the section 9 of the inner socket member and this collar extends into a groove 14 provided therefor in the hub portion 15 of a convexo-concave wheel body 16, which is retained in engagement with the collar 13 of the inner socket member by a plurality of screw bolts 17 or other fastening means. The hub 15 has a central opening or lubricant pocket 18 which has the outer end thereof enlarged and interiorly screwthreaded, as at 19, so as to receive a cap 20 having a portion thereof extending into the opening or lubricant pocket 18 and providing a wrench socket 21 by which the cap 20 may be manipulated. The cap 20 provides clearance for the screw bolt 17 and prevents accidental displacement of said screw bolt, and to prevent the loss of lubricant from the opening or pocket 18 a suitable packing 22 may be placed in said cap to engage the walls of the opening or pocket 18.

23 denotes a single or double felly carried by the body 16 of the wheel and this felly may accommodate a demountable or detachable rim and tire.

24 denotes an outer ball member having its outer end surrounding the hub 15 of the wheel body 16 and its inner end providing clearance for the inner socket member formed by the sections 8 and 9. On the sections 8 and 9 are placed bearing rings 25 and 26, the former being located in the outer end of the ball member 24 and the latter in the inner end of said ball member where it is held by a take-up wear member 27 held within the inner end of the ball member 24 by a retaining ring 28, which may be adjusted to properly position the wear member 27 so that it will coöperate with the inner ball member 24 in providing a proper support for the bearing rings 25 and 26, whereby these rings will afford a journal for the sections 8 and 9 of the inner socket member.

29 denotes opposed vertically alining trunnions or pintles surrounded by antifrictional roller bearing cages 30 in the bosses 31 of an outer socket member 32, said socket member being composed of two sections or parts provided with peripheral flanges 33 connected together, as at 34, so that the outer socket member will inclose the outer ball member 24. The outer end of the outer socket member 32 contains a suitable packing 35 engaging the outer ball member 24, and the inner end of the outer socket member is connected, as at 36, to the flared end 37 of the axle or shaft housing 1, so that the outer socket member 32 will be rigidly supported thereby and afford an inclosure for the outer ball member 24 and its trunnions or pintles 29.

38 denotes a fork or yoke which has its ends fixed on the ends of the knuckle trunnions or pintles 29 so as to turn therewith and said fork or yoke is adapted to form part of the steering mechanism or device, (not shown).

Referring again to the convexo-concave wheel body 16, it will be observed that said body serves as a shield for the outer side of the outer ball member 24 and the outer socket member 32, besides permitting of the felly of the wheel being in a vertical plane with the knuckle trunnions or pintles 29, so that the wheel may swing in a horizontal plane with the inner and outer ball members moving in the inner and outer socket members, and with the outer socket member journaled in the bearing rings in the outer ball member, it is possible for the wheel to freely revolve during a change of direction in the travel of said wheel.

It is apparent from the novel arrangement of the ball and socket members that a large lubricant chamber is formed in the outer socket member 32, consequently there can be a thorough lubrication of all parts of wheel assembly. It is obvious that packing rings, lubricant passages, gaskets and other packing or lubricant conducting structures may be provided to insure distribution of the lubricant throughout the universal driving connection, and while in the drawing we have shown a preferred embodiment of our invention, it is to be understood that the structural elements are susceptible to such variations and modifications as fall within the scope of the appended claims.

What we claim is:—

1. In a driven wheel assembly, a hollow semi-spherical fixed outer socket member, a hollow semi-spherical ball member trunnioned in said outer socket member, an inner socket member within the bell member and having a bearing therein, a wheel having a hub portion secured to said inner socket member to rotate therewith within the ball member, the outer end of the ball member being open to receive the hub portion, and driving means extending into the inner open end of the ball member and articulated to the inner socket member for imparting rotation to said wheel, said outer socket member and ball member together forming a spherical casing.

2. A driven wheel assembly as characterized in claim 1, wherein said wheel hub portion is formed to receive an extended portion on said inner socket member and to extend into the outer open end of said ball member, and including means for detachably securing said hub portion to said extended portion of said inner socket member.

3. A driven wheel assembly as characterized in claim 1 wherein said wheel hub portion is formed tubular to provide a lubricant chamber, and including means for detachably securing said hub portion to said inner socket member, and a cap to close the outer end of said lubricant chamber and positioned to cover and prevent accidental detachment of said securing means.

4. A driven wheel assembly as characterized in claim 1 wherein said outer socket member is provided with bearings for trunnions on said outer ball member and is formed in two parts with the plane of the meeting faces of said parts intersecting the axes of said bearings, together with means for detachably securing said parts of said socket member together.

5. In a driving wheel assembly, a hollow semi-spherical fixed outer socket member having opposed bearings, a semi-spherical hollow outer ball member fitting within said outer socket member and having trunnions engaging said bearings, said outer ball member having open ends, an inner semi-spherical socket member within the outer ball member, bearing rings interposed between said outer ball member and inner socket member forming an internal bearing in the ball member permitting free rotation of the inner socket member therein, means detachably carried by the ball member for detachably holding said outer ball member and rings in operative relation to said inner socket member, a wheel having a hub portion extending into an open end of said outer ball member and secured to said inner socket member, a driving shaft extending into the opposite open end of said outer ball member, and an inner ball member on said shaft having universal driving engagement with the interior of said inner socket member.

6. A driving wheel assembly as characterized in claim 5, wherein the inner ball member on the driving shaft is detachably secured thereto and formed in two parts, the meeting faces of said parts being recessed to form sockets with the plane of said faces extending transversely of the shaft axis, together with studs to engage said sockets and extend radially outward from said ball, said inner socket member being internally grooved to receive said studs.

7. A driving wheel assembly as characterized in claim 5, wherein said inner socket member is split transversely forming separate detachably connected parts together forming a semi-spherical hollow socket within which the inner ball member on the shaft fits, said inner ball member and shaft being removable from said inner socket member by disconnecting the parts of said socket member.

8. A driving wheel assembly as characterized in claim 5, wherein the inner ball member is divided transversely of the shaft axis into two parts and the meeting faces of said parts formed with grooved recesses forming sockets opening through the outer surface of the ball, together with studs engaging said sockets and provided with ribs to engage the grooves in the recesses, and detachable means on the end of the shaft for holding the ball member thereon with the two parts thereof in contact to hold the studs in place within their sockets.

In testimony whereof we affix our signatures in presence of two witnesses.

SILAS V. DUSSEAU.
MAURICE G. DUSSEAU.

Witnesses:
ANNA M. DORR,
MARGARET WELSH.